(No Model.)
W. KERR.
SEWER TRAP.
No. 395,907. Patented Jan. 8, 1889.
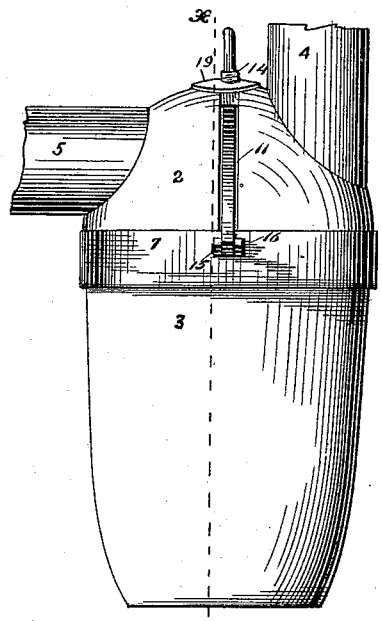
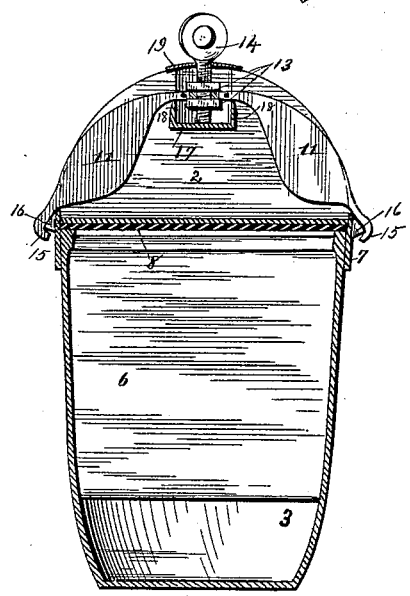
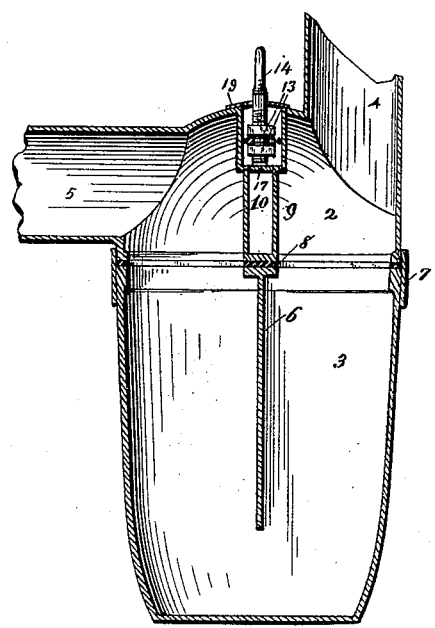
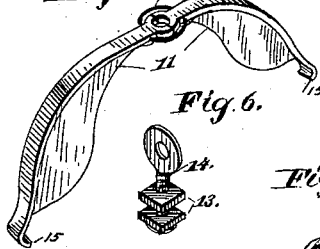
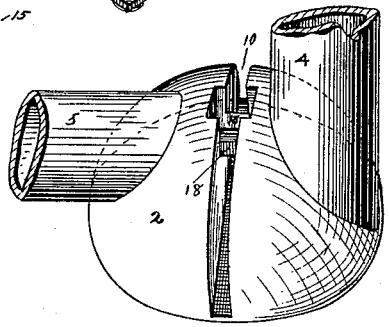
Witnesses.
Wm. M. Monroe.
J. C. Corey.
Inventor
William Kerr.
by
Fr. J. Fisher
Attorney.

UNITED STATES PATENT OFFICE.

WILLIAM KERR, OF CLEVELAND, OHIO.

SEWER-TRAP.

SPECIFICATION forming part of Letters Patent No. 395,907, dated January 8, 1889.

Application filed September 10, 1888. Serial No. 285,058. (No model.)

*To all whom it may concern:*

Be it known that I, WILLIAM KERR, a citizen of the United States, residing at Cleveland, in the county of Cuyahoga and State of Ohio, have invented certain new and useful Improvements in Sewer-Traps; and I do hereby declare that the following is a full, clear, and exact description of the invention, which will enable others skilled in the art to which it appertains to make and use the same.

My invention has reference to sewer-traps; and the object of the invention is to provide a trap for sinks, bath-tubs, and the like places, where ordinarily the trap is so located as to be difficult of approach, and hence difficult to uncouple when cleansing is required. As a rule, these traps, thus located out of convenient reach in dark places, have the further objection of being so made that it requires tools and a strong arm, with some mechanical skill, to remove and replace them; and in case they have been in position for some time, with accumulated rust about the joints, no ordinary tools will suffice to release them from their seats.

The purpose of my invention is to obviate these objections and to furnish a trap that can be easily detached and replaced by an unskilled person, and which possesses other meritorious and novel features and advantages, all as shown and described, and particularly pointed out in the claims.

In the accompanying drawings, forming part of this specification, Figure 1 is a side elevation of my improved trap. Fig. 2 is a vertical section of the same on line *x x*, Fig. 1. Fig. 3 is a vertical section of the trap at right angles to the section shown in Fig. 2. Fig. 4 is a perspective view of the top of the trap; Fig. 5, a perspective view of the yoke which supports the cup of the trap, and Fig. 6 is a view of the connecting-bolt.

It will be noticed that the trap proper consists of two parts or sections, 2 3. The inlet-pipe 4 and discharge-pipe 5 are shown as connected with the top section, 2, and may stand in the position to said section, as shown, or in any other convenient position, according to the connections to be made.

Section 3, consisting of what is termed the "cup" of the trap, has a central diaphragm, 6, extending from its top edge down, say, about three-fourths the depth of the cup, thus leaving ample passage for the water beneath the diaphragm from the inlet to the outlet side of the trap. The top of the diaphragm, which is even with the edge of the cup, is preferably widened so as to be more easily packed, to prevent escape of fluid or gas from one chamber to the other on the respective sides of the trap.

The form of trap shown here is supposed to be made of lead. If of lead or the like soft metal, I solder a brass band, 7, about the top of the cup, which band extends above the edge of the cup and outside and closely around the downwardly-projecting edge of the upper section and practically to a level with the level of the outflow, so that thereby when the cup is removed to be cleansed the water normally standing therein will not overflow, but may be carried bodily away and emptied. Ordinarily in disengaging cups from traps the act is unavoidably attended by the spilling or running out of a considerable quantity of water, which for many reasons it is desirable to avoid. This I do practically avoid by forming my cup with a band, as shown. In case a brass trap were used the band might be cast therewith as a projecting flange or outer edge of the cup. A packing, 8, of leather or other suitable material, is interposed between the upper and lower sections, 2 3, round their edge as well as across the center.

To complete the separation of the trap into inlet and outlet chambers having communication only through the bottom of the cup, it is necessary also to have a diaphragm in the upper section matching with the diaphragm in the lower section. In this case, to subserve a still further purpose, this diaphragm 9 is double, and extends transversely of the top section from side to side, with an open space or slot, 10, between the walls thereof. Along their lower edge the walls are united, thus forming a wide bearing-surface to match the top of the lower diaphragm.

Now recurring to the objection to traps that are difficult to release and replace without special tools and the awkwardness of approach in dark and obscure places, I have conceived the idea of remedying this objection by supplying connecting mechanism, which answers every purpose of closing to form a seal against water and sewer-gas, and yet may be quickly and easily released or refastened by a woman or even a child of years and intelligence. To this end the construction consists in a yoke, 11, formed of two parts connected by a wire, 12, or the like, so that they are pivotally and loosely united and held, as seen in Fig. 2, between nuts 13 on thumb-screw 14. This yoke occupies the slot 10, which is enlarged immediately at its top center, forming an angular recess, in which the nuts 13 are seated and held from turning, but are free to rise and fall on the screw 14 when said screw is turned to loosen or fasten the cup 3.

It will be seen that each arm of the yoke has a catch, 15, which engages a projection, 16, on the brass collar or band on the cup, so that when the thumb-screw is turned to raise the inner arms of the yoke these catches will engage the lugs 16 and fasten the cup, and when turned the opposite way will release said arms and allow the cup to be turned slightly in a horizontal direction to be disengaged and removed.

It will also be seen that the thumb-screw has a bearing, 17, which extends across the slot 10 at the bottom of the recess, and extending up from this bearing on either side thereof—say about one-third the depth of the recess—are shoulders 18. (Seen clearly in Fig. 2.) On the top of the trap the thumb-screw passes through a collar or washer, 19, which is soldered to its position. Then when the thumb-screw is turned it simply turns in its bearings and the nuts carry the inner ends of the yoke-arms up or down. It will be observed that when the nuts are carried below a certain position, as in releasing the cup, the yoke-arms will bear against the shoulders 18, and thus be forced outward at their outer extremities; or a person can by raising and lowering the thumb-nut in its bearings by one hand throw said arms outward or inward at their outer extremities to engage or disengage the lugs on the cup, as when it is desired to attach or detach said cup. In this way a person is enabled to handle the cup with one hand and the securing mechanism by the other, and this is a matter of great convenience.

The diaphragm need not be placed directly in the center of the trap, and it may be circular from side to side, instead of straight across, as shown, the same as if a section of, say, the inlet-pipe were employed to form the subdivision between the inlet and the outlet chambers of the trap.

Having thus described my invention, what I claim as new, and desire to secure by Letters Patent, is—

1. A sewer-trap consisting of a fixed upper section having the inlet and the outlet pipes wholly connected therewith, a detachable lower section, and a diaphragm extending down through the center of the trap near to the bottom of the lower section, substantially as set forth.

2. A sewer-trap consisting of two sections, each section having part of a central vertical diaphragm formed integral therewith and meeting substantially on the line of the joint between the sections, whereby the water entering upon one side of the trap is forced beneath the diaphragm to cross to the other side, substantially as set forth.

3. In a sewer-trap, a stationary upper section having the inlet and outlet pipes of the trap, a detachable lower section, a central diaphragm, a part of which is formed in each section, and arms supported on the upper section and engaging the lower section, whereby said sections are held together, substantially as set forth.

4. A sewer-trap consisting of two sections with a diaphragm, a part of which is formed in each section, a projecting rim on the lower section, and packing around said rim and between the parts of the diaphragm, substantially as set forth.

5. In a sewer-trap formed in two sections, an upper section having a transverse slot, the walls of which form a part of a diaphragm, a lower section with a part of a diaphragm therein, the said parts matching each other, and a lock in the transverse slot to hold the lower section in position, substantially as set forth.

6. In a sewer-trap, an upper section having a transverse slot with walls forming a diaphragm, a lower section with a diaphragm immediately beneath the diaphragm in the upper section, and yoke-arms and screw in said slot to support the lower section, substantially as set forth.

7. In a sewer-trap, a cup-shaped detachable section, a fixed upper section having a transverse slot, pivoted yoke-arms in said slot with a thumb-nut for raising and lowering said arms, and shoulders on which said arms bear when being raised, substantially as set forth.

WILLIAM KERR.

Witnesses:
IRENE COREY,
H. T. FISHER.